United States Patent [19]

Begeja et al.

[11] Patent Number: 6,141,545
[45] Date of Patent: *Oct. 31, 2000

[54] METHOD AND SYSTEM FOR REMOTE CALL FORWARDING OF TELEPHONE CALLS FROM CELLULAR PHONE

[75] Inventors: Lee Begeja, Gillette; Jeffrey Joseph Farah, North Brunswick, both of N.J.; Neil A. Ostroff, Kirkland, Wash.

[73] Assignee: AT&T Wireless Svcs Inc., Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 09/010,616

[22] Filed: Jan. 22, 1998

[51] Int. Cl.⁷ ........................................................ H04M 3/42
[52] U.S. Cl. ........................... 455/417; 455/414; 455/445; 379/211
[58] Field of Search ..................... 455/414, 417, 455/445; 379/207, 259

[56] References Cited

U.S. PATENT DOCUMENTS

| | | | |
|---|---|---|---|
| 5,353,331 | 10/1994 | Emery et al. | 455/445 |
| 5,428,663 | 6/1995 | Grimes et al. | 455/417 |
| 5,440,614 | 8/1995 | Sonberg et al. | 455/414 |
| 5,537,467 | 7/1996 | Cheng et al. | 455/417 |
| 5,579,375 | 11/1996 | Ginter | 455/417 |
| 5,920,618 | 7/1999 | Fleischer, III et al. | 379/207 |

Primary Examiner—Nguyen Vo
Assistant Examiner—Greta J. Fuller

[57] ABSTRACT

A subscriber to a remote call forwarding feature on a wire-line telephone line associated with a PBX (101) or central office (402) can enable that feature by dialing feature code from his cellular phone (103, 403). The subscriber dials a feature code from his cellular phone, which feature code is received by the cellular phone's Mobile Switching Center (MSC) (105, 405) and forwarded to a Service Control Point (SCP) (106, 406). The SCP recognizes the feature code as a request to invoke the remote call forwarding feature on the subscriber's wire-line telephone so that calls directed to that wire-line telephone are forwarded to the cellular phone. Receipt of that feature code by the SCP, together with the cellular phone's Electronic Serial Number (ESN) and Mobile Identification Number (MIN) identifies the subscriber and the feature to be invoked for that subscriber. By performing a database (108, 408) lookup associated with that ESN and MIN, information is retrieved relating to what PBX or switch should be contacted to invoke the feature, how and where to contact that PBX or switch, and what specifically must be sent to that PBX or switch to invoke the feature on the subscriber's telephone line.

21 Claims, 3 Drawing Sheets

FIG. 2

| 201 MIN-ESN | 202 PBX TELEPHONE # | 203 EXTENSION | 204 TYPE PBX | 205 PASSWORD | 206 HOW ACCESS PBX | 207 ADDRESS OR TELEPHONE # ASSOCIATED WITH ACCESS | 208 TRANSLATION COMMANDS | 209 SPECIAL PROTOCOLS |
|---|---|---|---|---|---|---|---|---|
| . . . | . . . | . . . | . . . | . . . | . . . | . . . | . . . | . . . |
| 2015559876/XYZ123 ← 210 | 7325554000 | 4321 | DEFINITY G3 | *#HELP | CORPORATE INTRANET | 123.456.78.90.12 | | |
| . . . | . . . | . . . | . . . | . . . | . . . | . . . | . . . | . . . |

METHOD AND SYSTEM FOR REMOTE CALL FORWARDING OF TELEPHONE CALLS FROM CELLULAR PHONE

TECHNICAL FIELD

This invention relates to telecommunications, and more particularly, to a method and system for remotely initiating a call forwarding feature associated with a subscriber's home or office telephone line via the subscriber's mobile cellular telephone so that calls are automatically forwarded to the cellular telephone from the subscriber's home or office telephone.

BACKGROUND OF THE INVENTION

Call forwarding is a feature commonly available through many telephone companies that enables a subscriber to automatically have his telephone calls forwarded to another telephone number from the telephone line to which they were initially directed. In its basic implementation, a subscriber dials a feature code from the telephone associated with the subscribed-to service and inputs the forwarding telephone number to which he wants subsequent calls directed. The central office switch recognizes the feature code and the telephone line from which the subscriber has dialed, and the central office switch thereafter redirects calls from the subscriber's telephone line to the forwarding telephone number. For remote call forwarding, the subscriber is not at the phone which is associated with the feature.

Two methods are commonly available: a network service or using specialized subscriber equipment connected to the subscriber's telephone line. As a network service, in order to invoke call forwarding to the telephone at the subscriber's current location, the subscriber makes an actual phone call to a designated special telephone number associated with his local switch, provides the number of the telephone associated with the subscribed-to feature, inputs a PIN to prevent unauthorized call forwarding, and then inputs a feature code designated for call forwarding. The telephone number from which the subscriber initiates the procedure is recognized by the network and the subscriber's central office switch thereafter directs calls from the subscriber's telephone line to the telephone line from which the remote call forwarding feature has been invoked.

Using specialized subscriber equipment, in order to invoke remote call forwarding, the subscriber places a call to his specialized equipment, inputs a PIN to prevent unauthorized call forwarding, and then inputs the telephone number to which calls should be forwarded. The specialized equipment then connects to the subscriber's telephone line and dials the call forward feature code and forwarding telephone number following the same procedure as basic call forwarding. The central office switch recognizes the feature code and the telephone line from which the subscriber's specialized equipment has dialed and the central office switch thereafter redirects telephone calls from the subscriber's telephone line to the forwarding telephone number.

Both basic call forwarding and remote call forwarding are features that can be associated with a subscriber's home telephone in which calls are redirected by the subscriber's switch in the local exchange office. Basic call forwarding and remote call forwarding are also features that can be associated with a telephone connected to a PBX in a corporate environment. As described above, for basic call forwarding the user enters a feature code from his telephone together with the telephone number to which calls are to be directed. For remote call forwarding, the user must dial a specific extension on the PBX, enter his own extension number, and a PIN. Once call forwarding is invoked, the PBX thereafter places an outbound telephone call to the forwarding telephone number in response to an inbound call directed to the forwarder's telephone number and bridges the inbound and outbound telephone calls.

A user of a mobile cellular telephone can invoke remote call forwarding to his cellular telephone from his home or office telephone in a manner described above. Thus, as described above, the user must dial a special telephone number, which number is either associated with his local switch or PBX, and then enter his telephone number and a PIN. Disadvantageously, such a procedure over a wireless cellular network can provide security problems that are not present when remotely invoking a call forward feature from a telephone on the secure wire-line telephone system. Specifically, since a user's touch-tone inputs on the cellular phone can possibly be intercepted, an eavesdropper could illegal obtain a user's telephone number and password and then remotely invoke the call forwarding feature to forward calls to some desired telephone number.

An object of the present invention is to securely invoke a remote call forwarding feature for a subscriber's wire-line telephone from the subscriber's cellular phone.

An additional object of the present invention it to invoke a remote call forwarding feature from a subscriber's cellular phone in a manner that does not require the subscriber to place a separate phone call and to input a PIN.

SUMMARY OF THE INVENTION

In accordance with the present invention, a subscriber to a remote call forwarding feature enables that feature on his wire-line telephone line by dialing a feature code from his cellular phone. Specifically, the subscriber dials a feature code from his cellular phone, which feature code is received by the cellular phone's Mobile Switching Center (MSC) and is forwarded to a Service Control Point (SCP) together with the cellular phone's Electronic Serial Number (ESN) and Mobile Identification Number (MIN) (the cellular phone's telephone number), the latter together uniquely identifying the subscriber. The SCP recognizes the feature code as a request to invoke a remote call forwarding feature on the subscriber's office or home wire-line telephone line on which the remote call forwarding feature is subscribed to by the subscriber or is available to the subscriber. By performing, at the SCP, a database lookup associated with that subscriber as determined by the MIN and ESN, the PBX phone line or home telephone phone line on which call forwarding is to invoked is determined. Further information is also retrieved in association with the subscriber's identity including information relating to the specific equipment (e.g., the PBX or local switch) on which the call forwarding is to be invoked, the subscriber's telephone number or extension on the PBX, the subscriber's PIN if the PBX or local switch requires a PIN to invoke the feature, and a network address or telephone number through which the local switch or PBX can be reached. This information, together with the MIN is then sent over a secure transmission medium to such network address or telephone number to the PBX or local switch, which in response thereto then invokes the remote call forwarding feature for the subscriber's line to forward calls to the identified MIN. Advantageously, remote call forwarding to the cellular phone is securely effected without requiring the subscriber to enter a PIN through his cellular phone. Further, the present invention can be used to remotely invoke through a subscriber's cellular telephone other features associated with a subscriber's wire-line office or home phone line.

BRIEF DESCRIPTION OF THE DRAWINGS

FIG. 2 shows an example of a database associated with a Service Control Point (SCP) that stores the information necessary to contact the subscriber's PBX;

DETAILED DESCRIPTION

Figure 1:
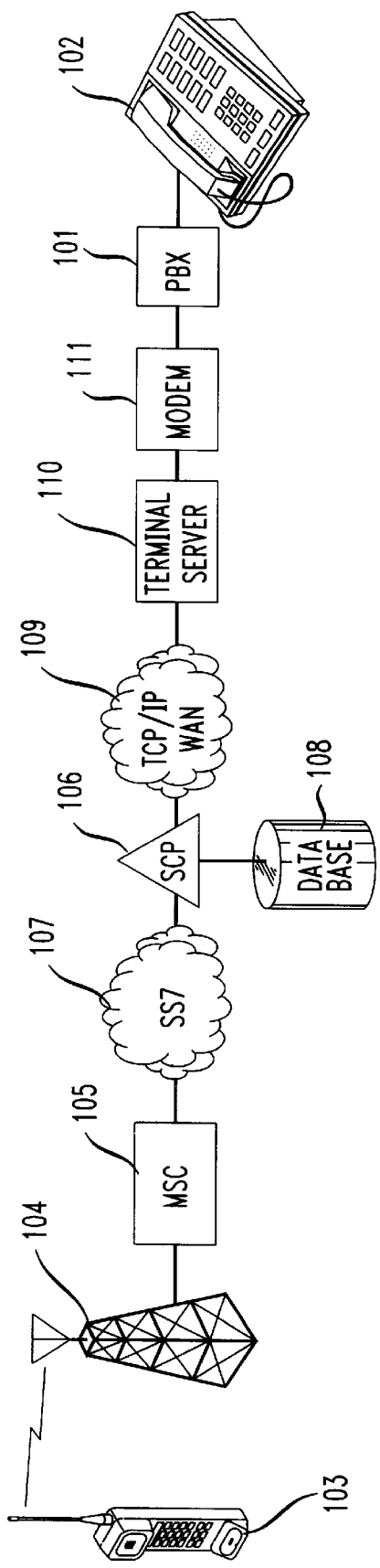
FIG. 1 is a block diagram of an embodiment of the present invention showing a subscriber's cellular telephone invoking a remote call forwarding feature associated with his office PBX telephone station.

With reference to FIG. 1, users of telephones connected to PBX 101, such as telephone 102, are assumed to be capable of remotely call forwarding calls directed to their telephone extension. Depending on the particular PBX equipment, such call forwarding may be effected only from another telephone directly connected to the PBX. An example of such a PBX may be a Definity® G3 PBX available from Lucent Technologies, Inc. Other PBXs may allow a telephone not directly connected to the PBX to dial into a special extension number and through an interaction with the subscriber, invoke the remote call forwarding feature for an identified PBX line so that calls originating from within or outside the PBX environment can be forwarded to the subscriber's called-from telephone number, the latter being from either inside or outside the PBX environment.

In accordance with the present invention, the subscriber associated with telephone 102 invokes the remote call forwarding feature on his associated PBX 101 by dialing a feature code from his mobile cellular telephone 103 so that calls directed to his telephone extension on PBX 101 are automatically forwarded to that cellular telephone 103. Specifically, the subscriber at cellular telephone 103 turns on his phone, which act registers his cellular telephone's embedded Electronic Serial Number (ESN) and Mobile Identification Number (MIN) through cell tower 104 with the nearest Mobile Switching Center (MSC) 105. The combination of the ESN and MIN uniquely identifies the subscriber associated with cellular telephone 103 to MSC 105. In order to invoke remote call forwarding of calls to his PBX-associated telephone to his cellular telephone, the subscriber then inputs a feature code from his cellular telephone 103 such as, for example, *37. Such a feature code would be designated by the cellular provider as a feature code for invoking remote call forwarding to the called-from cellular phone of calls to its subscribers' PBX-associated telephone lines. MSC 105, upon receiving the feature code *37 from cellular set 103, and the MIN and ESN of cellular set 103, sends that feature code together with the MIN and ESN identity of the subscriber to a Service Control Point (SCP) 106 over a secure network for further processing. The secure network can be an SS7 signaling network 107, as shown in FIG. 1. Alternatively, the connection to SCP 106 could be over any secure network such as a wireless data network, or secure Internet network. Further, the SCP and the MSC may be integrated at a single location, therefore eliminating the need for any network being interposed there between.

SCP 106 recognizes the received feature code as a request to invoke a special feature, specifically a remote call forwarding feature. At SCP 106, database 108 is accessed in response to the special feature requested by the subscriber at cellular phone 103 and the MIN/ESN identity of the subscriber associated with cellular phone 103. Database 108 includes a record associated with the MIN and ESN of each subscriber that contains the information required to access that subscriber's PBX to invoke the remote call forwarding feature to forward calls to cellular phone 103. FIG. 2 is an example of the type of information stored in database 108 needed to invoke the remote call forwarding feature at the subscriber's associated PBX to the cellular phone. More specifically, this includes the particular information which is required by the PBX to invoke remote call forwarding, in what format that information should be sent, where that information should be sent, and how that information should be sent. As can be noted, associated with a subscriber's MIN-ESN field pair 201 is a field 202 containing the telephone number of that subscriber's PBX, and a field 203 indicating the subscriber's extension on that PBX. Field 204 indicates the particular type of PBX equipment associated with that subscriber, and the procedures and/or signals required by that PBX to invoke a remote call forwarding feature thereon. Field 205 indicates the subscriber's password, if the type of PBX in field 204 requires the inputting of a password to invoke the remote call forwarding feature for a particular extension. Field 206 contains information on how to access the PBX. Specifically, as will be described hereinafter, the secure transmission medium over which such information required by the PBX is to be transmitted to the PBX, as for example via a packet computer network such as the Internet or a corporate Intranet, a wireless data network, or the SS7 signaling network. Field 207 contains an address associated with the transmission medium in field 206 to which the information is to be transmitted. Thus, for example, and as will be described below, if the secure transmission medium is via an Intranet over a TCP/IP WAN connection, an IP address of a terminal server to which the information is to be directed is indicated in this field. Other information, such as translation commands and special protocols required by equipment that may be connected to the PBX can be in separate fields 208 and 209, or incorporated into one of the fields described above. Record 210 shows data in some of the fields associated with a particular MIN/ESN.

With reference again to FIG. 1, in the specific embodiment described herein the information retrieved by SCP 106 from database 108, including the MIN of the subscriber's cellular phone, is encapsulated into a message and transmitted over a secure corporate Intranet, a TCP/IP WAN 109, to a terminal server 110 at an IP address specified in field 207. The terminal server 110 receives the message, performs a protocol conversion to the command signals that need to be inputted to the PBX 101, and sends these commands, together with any necessary translation commands, to a modem 111 that is actually connected to PBX 101. Modem 111 appears to PBX 101 as a station set on the PBX, and the command information including the dial codes, the subscriber's extension number, MIN to which calls are to forwarded to, the subscriber's password, if necessary, etc., are inputted to PBX to effect the call forwarding capability of PBX 101. Although this embodiment shows a modem interconnecting the terminal server 110 and PBX 101, the PBX may have its own internal modem to which the terminal server can be connected, or may have an inherent Internet capability to receive the information directly from TCP/IP WAN 109.

Further, the terminal server 110-modem 111 combination could be an intelligent platform that could have more sophisticated control of PBX 101. This more intelligent control could even include control of the administration terminal of the PBX from which more sophisticated and complicated commands could be entered.

In the embodiment described above, the information necessary to invoke the remote call forwarding feature in PBX 101 is transmitted from SCP 106 via a secure Intranet TCP/IP WAN connection 109. Other secure transport mediums could also be used. For example, a wireless data network, a secure Internet connection, or any other secure network could be used.

Advantageously, the present invention enables feature changes to be communicated to the subscriber's PBX 101 from that same subscriber's cellular phone 103 through the input by the subscriber at the cellular phone of a feature code. Further, through the wireless handshake between the cellular phone 103 and the MSC 105, which uniquely and unambiguously recognizes the registered user of the cellular set, security is ensured without requiring the subscriber to enter a PIN.

Figure 3:
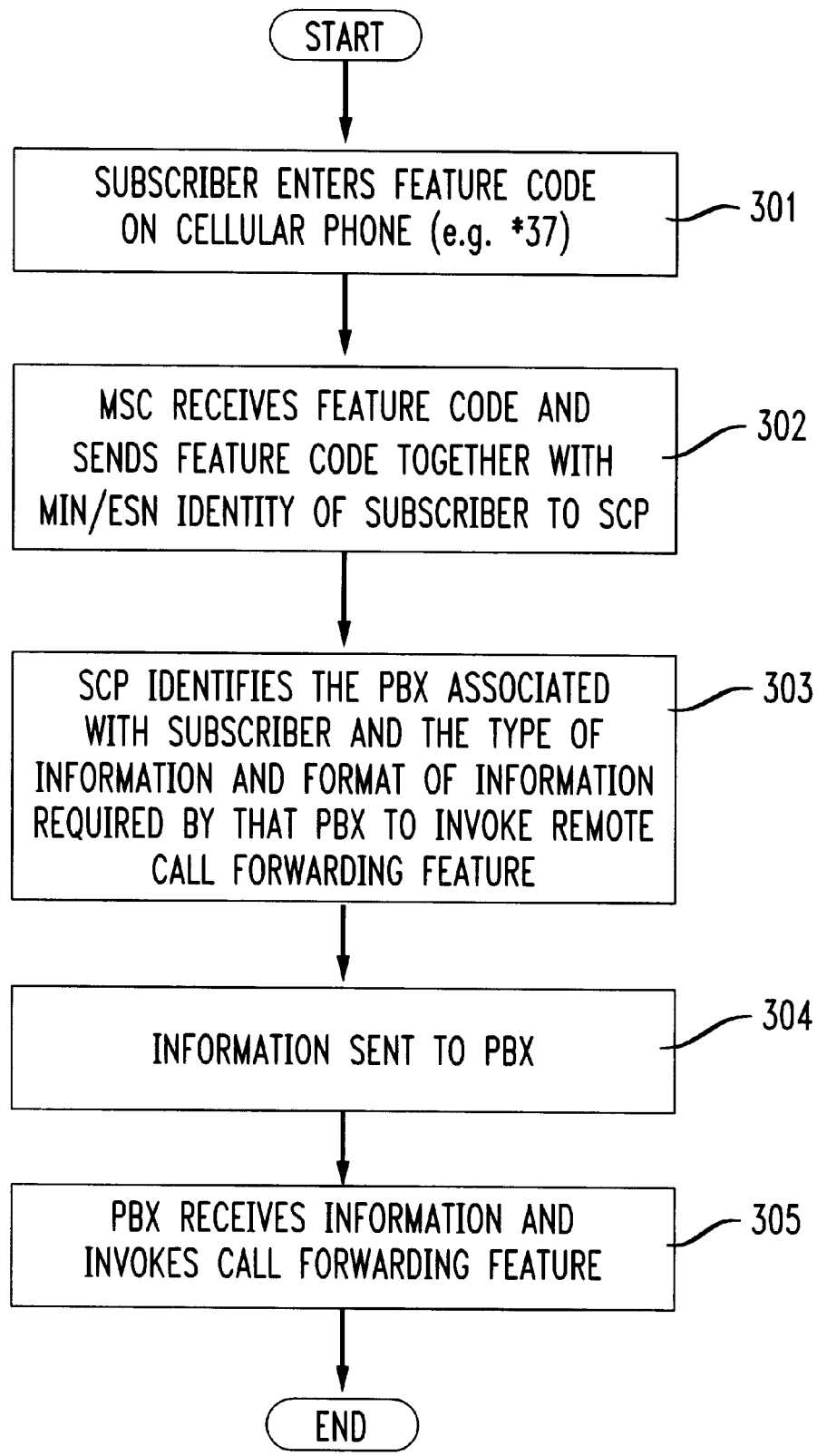
FIG. 3 is a flowchart detailing the steps of the present invention.

FIG. 3 illustrates the steps of the present invention. At step 301, the subscriber enters from his cellular phone the feature code (e.g., *37) to invoke remote call forwarding of calls directed to his PBX extension to his cellular phone. At step 302, the MSC recognizes the feature code and forwards that feature code together with the MIN/ESN identity of the cellular phone to the SCP. The SCP recognizes that feature code as a request for remote call forwarding of a subscriber's PBX calls. At step 303, using the MIN/ESN identity, the SCP identifies the PBX associated with that MIN/ESN, and for that identified PBX the type of information and the format required by that PBX to invoke a remote call forwarding of calls to a cellular phone MIN. At step 304, that information in the required format is sent to the PBX over a secure transport medium. At step 305, the PBX receives that information and invokes the remote call forwarding feature.

Figure 4:
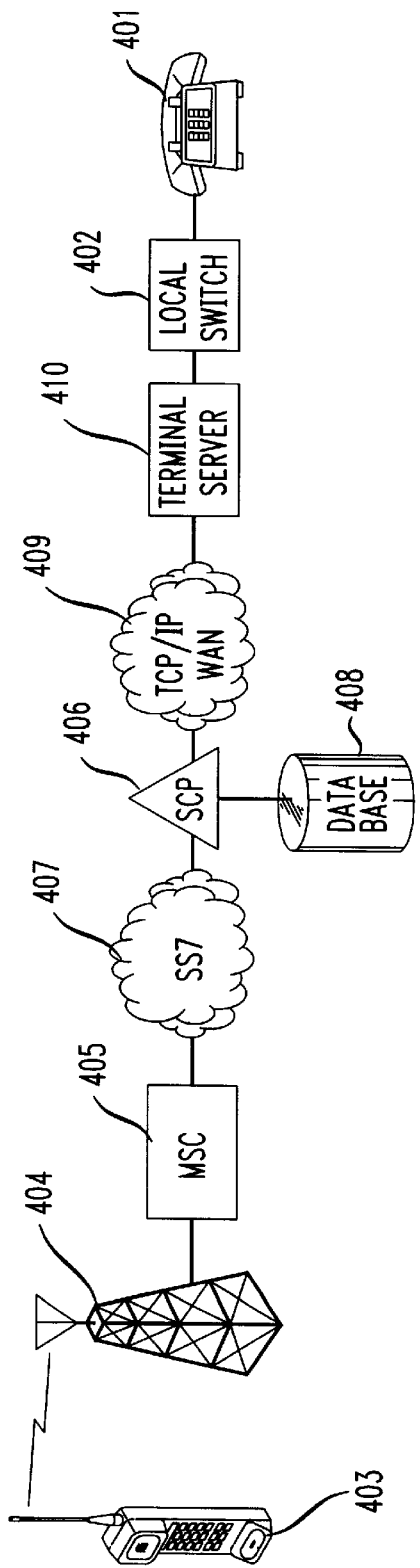
FIG. 4 is a block diagram of an embodiment of the present invention showing a subscriber's cellular telephone invoking a remote call forwarding feature associated his home telephone line.

In the above description, it was assumed that the subscriber desired to remotely invoke call forwarding of calls from his office number, which is associated with a PBX. Remote call forwarding is also a feature available for home or small business subscribers from Local Exchange Carriers through their electronic local switches such as the No. 5ESS switch, manufactured by Lucent Technologies, Inc. By dialing a feature code associated with remote call forwarding of non-PBX type of calls (e.g., *38), call forwarding of calls from a subscriber's non-PBX telephone line to a subscriber's cellular phone can be invoked in a manner similar to that described above for a subscriber's PBX line. With reference to FIG. 4, the subscriber at telephone 401 is connected over a conventional local loop to a local switch 402 at his Local Exchange Company (LEC). If that local switch 402 is an electronic switch and if the subscriber at telephone 401 is a subscriber to a call forwarding feature, the subscriber can call forward calls from station set 401 to another telephone number associated with local switch 402 or any other switch by entering a feature code and the forwarding number. If the subscriber also subscribes to a remote call forwarding feature that enables him to invoke the call forwarding feature from a remote telephone to which he wants calls redirected, the subscriber dials a special telephone number associated with his local switch from the remote telephone, and then enters a PIN and a feature code. The subscriber's local switch receives the number of the remote telephone from the network and then forwards calls placed to the subscriber's number to the remote telephone.

In accordance with the present invention, the subscriber at cellular phone 403 enters the special feature code (e.g., *38) to invoke remote call forwarding from a cellular phone, which is sent through cellular tower to MSC 405. MSC 405 sends that feature code together with the MIN/ESN identity of cellular phone 403 to SCP 406 via a secure network such as the SS7 signaling network 407. SCP 406 recognizes that feature code as a request to remotely invoke a call forwarding feature at a local switch. At SCP 406, database 408 is accessed to retrieve a record associated with the user identified by the MIN/ESN. That database, similar to the database previously described in FIG. 2, contains data fields which provide the information necessary for accessing local switch 402. These would include the type of local switch associated with the subscriber in addition to the other information that is required to interact with switch 402 to invoke the remote call forwarding feature to forward calls to the subscriber's cellular telephone 403. This includes the subscriber's PIN and the IP address of a terminal server 410 which is connected to switch 402 and to which SCP is connected via an Intranet TCP/IP WAN 409. The TCP/IP WAN is a particular embodiment of a secure network over which the call forwarding information is transmitted. As in the embodiment of FIG. 1, other secure transport mediums could be used between SCP 406 and local switch 402. Terminal server 410 performs the protocol conversions on the information transmitted in TCP/IP format from SCP 406 so that local switch 402, in response thereto, invokes call forwarding of those calls to the subscriber's cellular telephone 403 from the subscriber's land-line telephone 401.

Although the embodiments described above have described methods for remotely invoking a call forwarding feature from a cellular telephone, the present invention could also be used to remotely invoke other special features from the subscriber's cellular telephone. These obviously would include remotely canceling call forwarding to the cellular telephone and other features that can be associated with a subscriber's local telephone service, or are provided through a PBX, whether such features are currently available or may be made available at any time in the future. Further, although described in conjunction with a voice telephone, the present invention could be used to remotely invoke call forwarding of calls of any type, data or otherwise, to a wireless station set of any kind, from any kind of wire-line station set. Further, although described in conjunction with a cellular telephone, the present invention could be used in conjunction with any type or wireless telephone including, but not limited to digital and/or analog wireless telephones using Time Division Multiple Access or Code Division Multiple Access technologies and/or any other technology.

The above-described embodiments are illustrative of the principles of the present invention. Other embodiments may be devised by those skilled in the art without departing from the spirit and scope of the present invention.

The invention claimed is:

1. A wireless network method of invoking a feature associated with a subscriber's line on a wire-line facility from the subscriber's wireless station set comprising the steps of:
   a) receiving a feature code from the wireless station set indicative of the feature to be invoked and an identifier associated with the wireless station set;
   b) using the identifier associated with the wireless station set and the received feature code, determining the subscriber's wire-line facility and associated information required to invoke the feature in association with the subscriber's line on the wire-line facility including an address of one of a private branch exchange and extension and of a telephone number associated with the subscriber's line on the wire-line facility and a manner for sending that information; and c) sending that information to the address and in accordance with the manner determined in step b) to invoke the feature in association with the subscriber's line on the wire-line facility.

2. The method of claim 1 wherein the information is sent according to step c) over a secure transmission medium.

3. The method of claim 2 wherein the secure transmission medium is a wireless data network.

4. The method of claim 2 wherein the secure transmission medium is a packet computer network.

5. The method of claim 2 wherein the wireless station set is a cellular telephone.

6. The method of claim 1 wherein the feature is deactivation of an activated remote call forwarding feature which forwards calls directed to a telephone number associated with the subscriber's line on the wire-line facility to be received at the subscriber's wireless station set.

7. A wireless network method of invoking a feature associated with a subscriber's line on a wire-line facility from the subscriber's wireless station set comprising the steps of:

a) receiving a feature code from the wireless station set indicative of the feature to be invoked and an identifier associated with the wireless station set;

b) using the identifier associated with the wireless station set and the received feature code, determining the subscriber's wire-line facility and associated information required to invoke the feature in association with the subscriber's line on the wire-line facility including an address of one of a private branch exchange and extension and of a telephone number associated with the subscriber's line on the wire-line facility and a manner for sending that information; and c) sending that information to the address and in accordance with the manner determined in step b) to invoke the feature in association with the subscriber's line on the wire-line facility, wherein the feature is remote call forwarding to forward a call directed to a telephone number associated with the subscriber's line on the wire-line facility to be received at the subscriber's wireless station set.

8. The method of claim 6 wherein the subscriber's line on the wire-line facility is associated with a PBX and the information includes how to access the PBX and invoke the remote call forwarding feature on the subscriber's line, the subscriber's line being a PBX extension.

9. The method of claim 7 wherein the subscriber's line on the wire-line facility is associated with a central office switch and the information includes how to access the switch and invoke the remote call forwarding feature for a telephone number associated with the subscriber's line.

10. A system for invoking a feature associated with a subscriber's line on a wire-line facility from the subscriber's wireless station set comprising:

a mobile switching center which receives a feature code from the wireless station set indicative of the feature to be invoked and an identifier associated with the wireless station set; and a service control point connected to the mobile switching center, and an associated database, the service control point receiving from the mobile switching center the identifier associated with the wireless station set and the received feature code and retrieving from the database information associated with the received identifier information required to invoke the feature in association with the subscriber's line on the wire-line facility including an address of one of a private branch exchange and extension and of a telephone number associated with the subscriber's line on the wire line facility and a manner for sending the information.

11. The system of claim 10 wherein the mobile switching center and the service control point are connected over a secure transmission facility.

12. The system of claim 10 wherein the wireless station set is a cellular telephone.

13. The system of claim 10 wherein the feature is remote call forwarding to forward a call directed to a telephone number associated with the subscriber's line on the wire-line facility to be received at the subscriber's wireless station set.

14. The system of claim 13 wherein the subscriber's line on the wire-line facility is associated with a PBX and the information includes how to access the PBX and invoke the remote call forwarding feature on the subscriber's line, the subscriber's line being a PBX extension.

15. The method of claim 13 wherein the subscriber's line on the wire-line facility is associated with a central office switch and the information includes how to access the switch and invoke the remote call forwarding feature on the subscriber's line.

16. The system of claim 10 wherein the feature is deactivation of an activated remote call forwarding feature which forwards calls directed to a telephone number associated with the subscriber's line on the wire-line facility to be received at the subscriber's wireless station set.

17. A wireless network method of invoking a remote call forwarding feature associated with a subscriber's telephone line on a wire-line facility from the subscriber's mobile wireless telephone to forward calls directed to the wire-line telephone line to the wireless telephone, the method comprising the steps of:

a) receiving a feature code from the wireless telephone indicative of the remote call forwarding feature to be invoked and an identifier associated with the wireless telephone;

b) using the identifier associated with the wireless telephone and the received feature code, determining the subscriber's telephone line on the wire-line facility and associated information required to invoke the remote call forwarding feature on the subscriber telephone line on the wire-line facility including an address of one of a private branch exchange and extension and of a telephone number associated with the subscriber's line on the wire-line facility and a manner for sending that information; and c) sending that information to the address and in accordance with the manner determined in step b) to invoke the remote call forwarding feature on subscriber's telephone line on the wire-line facility.

18. The method of claim 17 wherein the subscriber's line on the wire-line facility is associated with a PBX and the information includes how to access the PBX and invoke the remote call forwarding feature on the subscriber's line, the subscriber's line being a PBX extension.

19. The method of claim 17 wherein the subscriber's line on the wire-line facility is associated with a central office switch and the information includes how to access the switch and invoke the remote call forwarding feature on the subscriber's line.

20. A method of invoking a remote call forwarding feature associated with a subscriber's telephone line capable of remote call forwarding from the subscriber's mobile wireless telephone to forward calls directed to the subscriber's telephone line to be received at the wireless telephone, the method comprising the step of receiving a feature code and an identifier of the wireless telephone at a wireless service controller and characterized in that said subscriber's telephone line having remote call forwarding is on a wire-line facility of a wired network and further characterized by the steps of determining remote call forwarding activation information via a database look-up of an address of one of a private branch exchange and extension and of a telephone number associated with the subscriber's telephone line of said wired network and a manner for transmitting remote call forwarding activation information and transmitting said remote call forwarding activation information to said determined address in accordance with said determined manner to invoke said remote call forwarding feature.

21. A method of invoking a remote call forwarding feature associated with a subscriber's telephone line capable of remote call forwarding from the subscriber's mobile wireless telephone to forward calls directed to the subscriber's telephone line to be received at the wireless telephone, the method comprising the step of receiving feature selection information and an identifier of the wireless telephone at a wireless service controller and characterized by said subscriber's telephone line having remote call forwarding being on a wire-line facility of a wired network and further characterized by the steps of:

determining remote call forwarding activation information via a database look-up of an address of one of a private branch exchange and extension and of a telephone number associated with the subscriber's telephone line of said wired network and a manner for transmitting remote call forwarding activation information; and transmitting said remote call forwarding activation information to said determined address in accordance with said determined manner to invoke said remote call forwarding feature.

\* \* \* \* \*